No. 723,928. PATENTED MAR. 31, 1903.
B. SCHWERIN.
ELECTRO-ENDOSMOTIC PROCESS OF EXTRACTING SUGAR.
APPLICATION FILED NOV. 15, 1901.
NO MODEL.
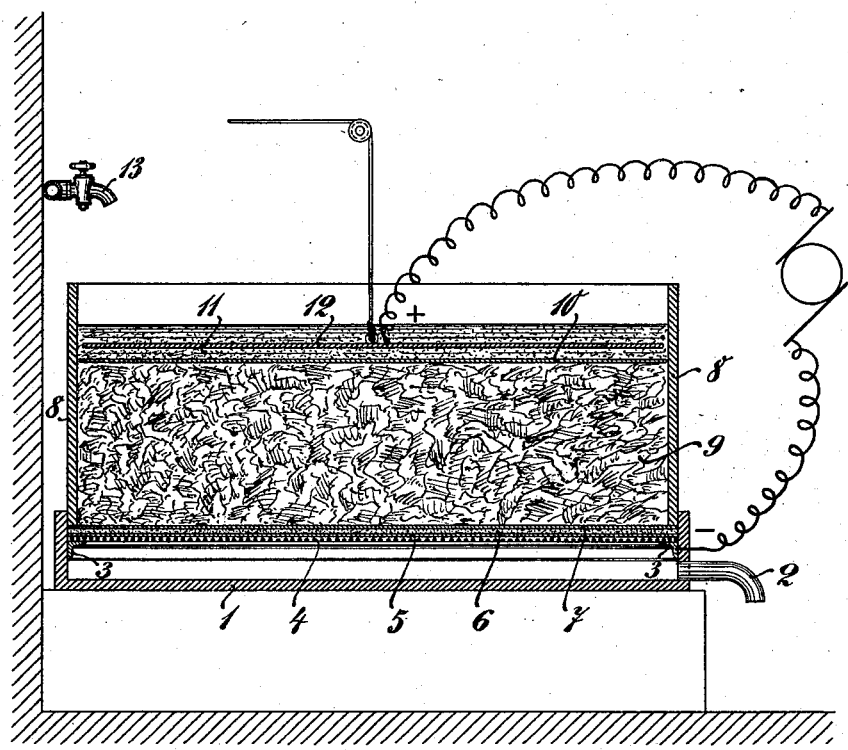

UNITED STATES PATENT OFFICE.

BOTHO SCHWERIN, OF BERLIN, GERMANY.

ELECTRO-ENDOSMOTIC PROCESS OF EXTRACTING SUGAR.

SPECIFICATION forming part of Letters Patent No. 723,928, dated March 31, 1903

Application filed November 15, 1901. Serial No. 82,430. (No specimens.)

*To all whom it may concern:*

Be it known that I, BOTHO SCHWERIN, a subject of the King of Prussia, German Emperor, residing at No. 19 Bernburgerstrasse, Berlin, in the Kingdom of Prussia, German Empire, have invented certain new and useful Improvements upon the Electro-Endosmotic Process of Extracting Sugar; and I do hereby declare that the following is a full, clear, and exact description of my invention, which will enable others skilled in the art to which it appertains to make and use the same.

This invention relates to the process of extracting sugar by acting with the electric current upon disintegrated wet saccharine material, which is placed between a negative electrode pervious to liquid and a layer of water separating the positive electrode from the saccharine material, as fully described and claimed in my United States Letters Patent No. 687,386, dated November 26, 1901.

It has for its object to improve the result of the whole.

To this end it consists, first, in causing the albuminous matter to separate out at the negative electrode, so as to be prevented from leaving the apparatus, and, second, in converting the acids accumulating in the beginning of the process in the water at the positive electrode into indissoluble and innocuous compounds, as far as is possible.

As to the first improvement, this is obtained by causing the liquor to pass through a layer of finely-divided carbon located at one or both sides of the negative electrode. I prefer to use animal charcoal, (bone-black, animal-black,) which has proved to yield the best result, even when applied in a very thin layer or layers; but I may also use finely-powdered wood-charcoal, coke, and the like, either alone or mixed with animal charcoal. I prefer, moreover, to apply the carbon layer to the inner side of the wire-gauze, which serves as the negative electrode—that is to say, that side of the latter which will be adjacent to the saccharine material to be treated—the said carbon layer being held between two filter-cloths. By these means I produce the hitherto-unknown effect that the albuminous matters dissolved in the liquor are caused to separate out closely to or upon the surface of the carbon layer prior to the formation of the hydroxids of alkaline metals at the negative electrode due to the electrolytical decomposition of salts of said metals present in the saccharine matter, whereby said albuminous matter and hydroxids are prevented from combining into soluble compounds passing with the saccharine solution through the negative electrode, whereas I collect at the other side of said electrode a clear, colorless, and concentrated solution of sugar having so high a degree of pureness that it may at once be crystallized, the crystallized-out sugar being of a satisfactorily white color. Compared with the usual method of bone-blacking the raw-sugar solution, the advantage resulting from the introduction of a carbon layer in connection with the negative electrode consists in that directly a concentrated, pure, and almost colorless solution fit for crystallization is obtained without the necessity of special costly apparatus and at a low cost, as only a thin layer of carbon is required and the liquor needs not to be heated, and, moreover, the loss of sugar occurring in replacing the layer is an extremely small one.

The second improvement is obtained by suspending in the water in which the positive electrode is immersed finely-powdered earthy compounds—that is to say, oxids or carbonates of alkaline earth or earth metals, such as calcium, barium, strontium, magnesium, aluminium, and the like, said oxids or carbonates reacting with the acids that appear at the positive electrode to form salts, which for the greater part are insoluble in water. By these means I provide for a very efficient protection of the positive pole against chemical decomposition, and, on the other hand, I prevent the water from being infected with substances which after some accumulation or in the progress of the treatment might diffuse back into the saccharine material, with the result of producing invertsugar or otherwise impurifying the sugar solution.

In realizing my said improvements I prefer to arrange the saccharine material in a horizontal layer, with the negative electrode made out of wire-gauze—for instance, copper-wire gauze—applied against its under side. I first place the wire-gauze and then cover the same with a filtering-cloth. On the latter I provide a thin layer of powdered carbon—for instance, by evenly spreading out thereon dust of bone-black—which I cover with another filtering-cloth. On the latter I place the saccharine material to be treated—for instance, slices of beet-root or disintegrated sugar-cane—and cover the same with a filtering-cloth. On the latter I provide a layer of water mixed with finely-powdered magnesium oxid or calcium carbonate or other suitable earthy compounds, and in this mixture I immerse in horizontal position a metal plate—for instance, an iron plate—to serve as the positive electrode.

In order to fully enable those skilled in the art to use my said improvements, I have illustrated on the annexed sheet a diagrammatical section of an apparatus for carrying them out into practice.

1 is a box preferably of square shape and made out of an electrically-non-conductive material—as, for instance, wood—which is open at the top and provided at its bottom with an opening 2 for the outflow of the sugar solution. Near the upper edge of the box are fixed at the inside supports 3 for the wire-gauze 4 and the layer of carbon 6 held between filter-cloths 5 and 7. When the wire-gauze and carbon layer are placed, a frame 8, constructed with an electrically-nonconductive material, preferably wood, and closely fitting in the box 1, is inserted into the latter so as to firmly clamp the wire-gauze, filtering-cloths, and interposed carbon layer between its lower edge and the supports 3. The frame is then filled with the saccharine material 9 up to a distance from its upper edge, said material covered with a filtering-cloth 10, a mixture 11 of water and earthy compound or compounds—for instance, calcium carbonate or magnesium oxid—poured in the space left above the filtering-cloth 10, and the metal plate 12, which is hung from a carrier (not shown) lowered so as to be suspended within the mixture of water and earthy compound. The plate 12 and the wire-gauze 4 are connected, the former with the positive and the latter with the negative pole of the dynamo or other source of electricity. The numeral 13 denotes a cock for supplying water to replace that which is driven through the cloth 10 into the saccharine material 9.

I wish it to be understood that the term "disintegrated" as used in connection with the term "saccharine material" is intended to express in a broad sense any sufficient degree of subdivision and that the term "earthly compound" is intended to comprise oxids and carbonates of the alkaline-earth metals and earth metals, as in connection with the use made of them they have proved to be true equivalents.

What I claim, and desire to secure by Letters Patent of the United States, is—

1. The process of extracting sugar which consists in placing the saccharine material to be treated in a disintegrated and wet state between a layer of finely-divided carbon supported by a negative electrode pervious to liquid and a body of water surrounding the positive electrode, driving the electrolytically non-dissociable liquid bodies present toward the negative electrode by passing a current through the said layer of water, material and layer of carbon by means of said electrodes, supplying the water driven into the material from the water surrounding the positive electrode, collecting the liquor percolating through the layer of carbon and its supporting negative electrode, and separating therefrom sugar, substantially as and for the purpose specified.

2. The process of extracting sugar which consists in placing the saccharine material to be treated in a disintegrated and wet state between a negative electrode pervious to liquid and a mixture of water and earthy compounds surrounding a positive electrode, driving the electrolytically non-dissociable liquid bodies present toward the negative electrode by passing a current through the said layer of water and material by means of said electrodes, supplying the water driven into the material from the water surrounding the positive electrode, collecting the liquor percolating through the layer of carbon and its supporting negative electrode, and separating therefrom sugar, substantially as and for the purpose specified.

3. The process of extracting sugar which consists in placing the saccharine material to be treated in a disintegrated and wet state between a layer of finely-divided carbon supported by a negative electrode pervious to liquid and a mixture of water and earthy compounds surrounding a positive electrode, driving the electrolytically non-dissociable liquid bodies present toward the negative electrode by passing a current through the said layer of water, material and layer of carbon by means of said electrodes, supplying the water driven into the material from the water surrounding the positive electrode, collecting the liquor percolating through the layer of carbon and its supporting negative electrode, and separating therefrom sugar, substantially as and for the purpose specified.

In testimony whereof I have hereunto set my hand in presence of two subscribing witnesses.

BOTHO SCHWERIN.

Witnesses:
H. R. McGINNIS,
ANNIE WIMBAUER.